United States Patent
Yu et al.

(10) Patent No.: US 12,402,205 B2
(45) Date of Patent: Aug. 26, 2025

(54) ALLOCATING RESOURCES FOR DIRECT USER EQUIPMENT COMMUNICATION

(71) Applicant: Nokia Technologies Oy, Espoo (FI)

(72) Inventors: Ling Yu, Kauniainen (FI); Vinh Van Phan, Oulu (FI); Nuno Manuel Kiilerich Pratas, Gistrup (DK); Prajwal Keshavamurthy, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 372 days.

(21) Appl. No.: 17/874,776

(22) Filed: Jul. 27, 2022

(65) Prior Publication Data

US 2023/0050074 A1    Feb. 16, 2023

(30) Foreign Application Priority Data

Jul. 27, 2021   (EP) ..................................... 21188023

(51) Int. Cl.
*H04W 76/28*   (2018.01)
*H04W 72/23*   (2023.01)

(52) U.S. Cl.
CPC ........... *H04W 76/28* (2018.02); *H04W 72/23* (2023.01)

(58) Field of Classification Search
CPC .............................. H04W 76/28; H04W 72/23
See application file for complete search history.

(56) References Cited

U.S. PATENT DOCUMENTS

| | | | |
|---|---|---|---|
| 10,492,107 B2 | 11/2019 | Park et al. | |
| 2018/0049225 A1 | 2/2018 | Lee et al. | |
| 2021/0051588 A1 | 2/2021 | Wu et al. | |
| 2021/0204100 A1 | 7/2021 | Lin et al. | |
| 2021/0227620 A1 | 7/2021 | Pan et al. | |

(Continued)

FOREIGN PATENT DOCUMENTS

| | | |
|---|---|---|
| CN | 111405645 A | 7/2020 |
| CN | 112689978 A | 4/2021 |

(Continued)

OTHER PUBLICATIONS

Huawei et al. R2-2105083. "Consideration on the sidelink DRX for unicast", 3GPP TSG RAN WG2, Meeting #114-e, Online May 19-May 27, 2021, [May 11, 2021], XP052006778.

(Continued)

*Primary Examiner* — Duc C Ho
(74) *Attorney, Agent, or Firm* — Lippes Mathias LLP

(57) ABSTRACT

An apparatus comprises at least one processor and at least one memory storing instructions that, when executed by the at least one processor, cause the apparatus at least to perform generating assistance information for a network node. The network node provides a grant of resources for sidelink communications between the apparatus and at least one receiving user equipment. The receiving user equipment is configured to operate in a discontinuous reception mode comprising a discontinuous reception cycle with an active time and an inactive time. The assistance information comprises a plurality of elements indicative of characteristics of the sidelink communications and at least one of the plurality of elements comprises an indication of the discontinuous reception mode of the receiving user equipment.

17 Claims, 5 Drawing Sheets

(56) References Cited

U.S. PATENT DOCUMENTS

Figure 1:
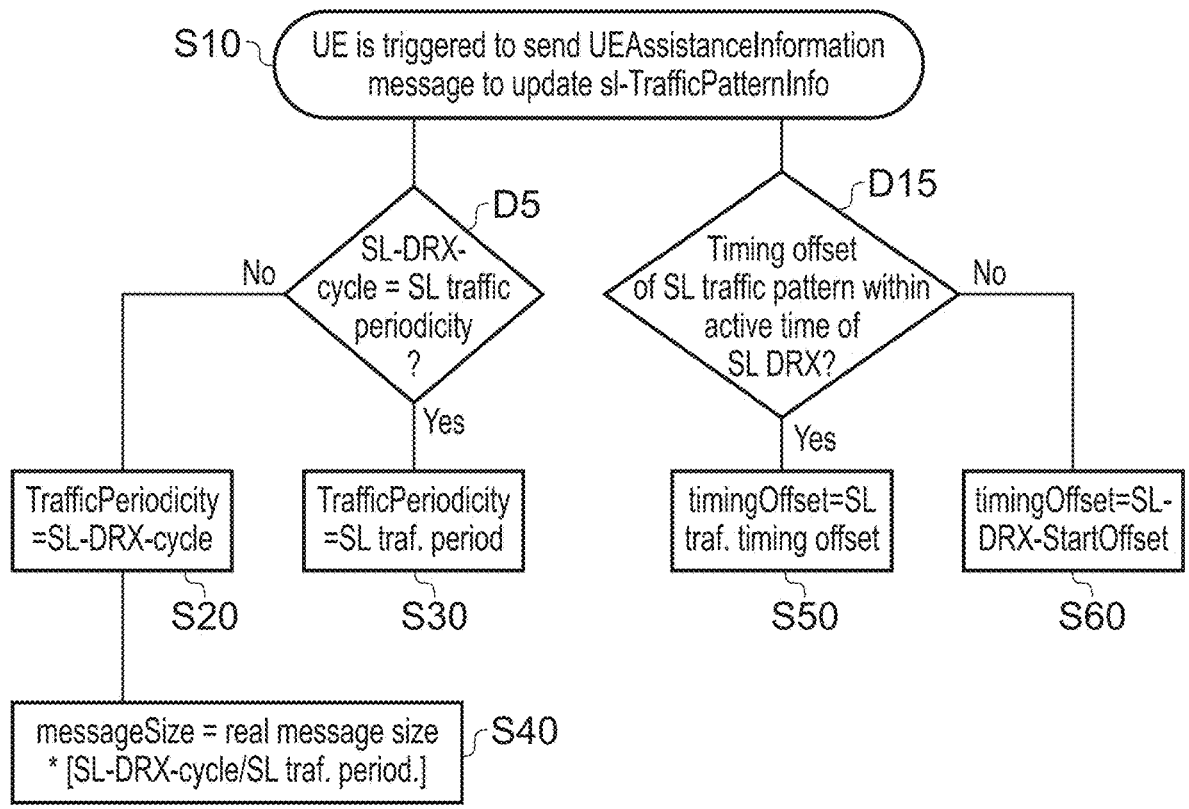

2021/0227621 A1 7/2021 Pan et al.
2021/0360733 A1* 11/2021 Bao .................. H04W 52/0216

FOREIGN PATENT DOCUMENTS

WO       2018/064477 A1    4/2018
WO    WO 2021/093203 A1    5/2021

OTHER PUBLICATIONS

OPPO: R2-2104841. "Summary of [POST113-e][704][V2X/SL] TX UE centric or RX UE centric DRX configuration determination (OPPO)", 3GPP TSG RAN WG2, Meeting #113bis-e, E-meeting, Apr. 2021, [May 11, 2021], XP052006591.

Lenovo et al. R2-2105458. "Coordination between Uu DRX and SL DRX", 3GPP TSG RAN WG2, Meeting #114-e, E-meeting, May 19-May 27, 2021, [May 11, 2021].

Huawei et al. R2-2105593. Discussion on SL communication impact on Uu DRX, 3GPP TSG RAN WG2, Meeting #114-e, E-meeting May 19-May 27, 2021, [May 11, 2021].

LG Electronics. RP-202846. "WID revision: NR sidelink enhancement", 3GPP TSG RAN, Meeting #90e, Electronic Meeting, Dec. 7-11, 2020, [Dec. 7, 2020].

Catt "DRX Active Time Alignment between Uu and SL", R2-2102690, 3GPP TSG-RAN WG2 Meeting #113bis-e, Apr. 4-20, 2021, 4 pgs.

Ericsson, et al. "General aspects of SL DRX", R2-2103003, 3GPP TSG-RAN WG2 #113bis-e, Apr. 12-20, 2021, 8 pgs.

Nokia, et al. "Further Issues on Sidelink Traffic Pattern for SL DRX Configuration", R2-2105958 3GPP TSG-RAN WG2 Meeting #114 Electronic, Elbonia, May 29-27, 2021, 3 pgs.

Fraunhofer et al. "Power Reduction for Sidelink Mode 2 Resource Allocation", R2-2100577 3GPP TSG-RAN WG2 Meeting #113-e, Online, Jan. 25-Feb. 5, 2021, 5 pgs.

* cited by examiner

ALLOCATING RESOURCES FOR DIRECT USER EQUIPMENT COMMUNICATION

This application is based on and claims priority to EP Patent Application No. EP 21188023.2, filed on Jul. 27, 2021, the contents of all of which are incorporated herein by reference in their entirety.

TECHNOLOGICAL FIELD

Various example embodiments relate to allocating resources for direct and in particular sidelink communication between user equipment.

BACKGROUND

User equipment (UE) may communicate directly with each other, in some cases using sidelink (SL) channels. Allocation of the sidelink channels may be done under control of the network node. There may be a semi-persistent scheduling of sidelink resources using a sidelink configured grant. In order for this allocation to reflect the needs of the UEs information about the sidelink transmissions may be sent to the network node as SL-UE-AssistanceInformationNR and/or as SidelinkUEInformation. This information provides the network node with information which may include the periodicity of the sidelink transmissions, the message sizes, any timing offset and quality of service requirements such as the packet delay budget. The network node uses this information when generating the sidelink configured grant.

A power saving aspect has been introduced to the user equipment so that there may be discontinuous reception (DRX) of SL signals at the UEs. Where SL DRX is operational then for the transmission to be reliably received it should be transmitted during the active time of the SL DRX at the receiving UE, Rx UE. This may not be straightforward as although the network may have some visibility of the SL DRX cycle, this cycle of the Rx UE may vary on occasion in a way that is not visible to the network.

It would be desirable to provide a way of allocating resources for sidelink transmissions that increased the probability that the transmissions will be successfully received.

BRIEF SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to various, but not necessarily all, embodiments of the invention there is provided according to a first aspect an apparatus, comprising: means for generating assistance information for a network node, the network node providing a grant of resources for sidelink communications between said apparatus and at least one receiving user equipment, said at least one receiving user equipment being configured to operate in a discontinuous reception mode comprising a discontinuous reception cycle with an active time and an inactive time, said assistance information comprising a plurality of elements indicative of characteristics of said sidelink communications; wherein at least one of said plurality of elements comprises an indication of said discontinuous reception mode of said receiving user equipment.

In some example embodiments said characteristics of said sidelink communication comprise at least one of sidelink traffic characteristics and sidelink quality of service characteristics.

In some example embodiments said assistance information comprises at least one of UE assistance information and UE sidelink information In some example embodiments said apparatus further comprises: means for comparing a traffic periodicity of said sidelink communications and a period of said discontinuous reception cycle, said means for generating said assistance information being responsive to said means for comparing indicating that said period of said discontinuous reception cycle is different to said traffic periodicity to update said at least one of said plurality of elements to provide said indication of said discontinuous reception mode.

In some example embodiments said at least one of said plurality of elements comprises an element configured to indicate periodicity data said element being updated with an indication of a period of said discontinuous reception cycle.

In some example embodiments said at least one of said plurality of elements comprises an element configured to indicate a message size said element being updated by multiplying said element by a factor derived from a ratio of said discontinuous reception cycle and said traffic periodicity.

In some example embodiments said means for comparing is configured in response to said period of said discontinuous reception cycle being shorter than said periodicity to compare an allowed delay time of said sidelink communication with said discontinuous reception cycle prior to said means for generating updating said message size and only where said allowed delay time is longer than said discontinuous reception cycle to indicate to said means for generating to update said message size.

In some example embodiments the apparatus further comprises: a means for reviewing a timing offset value for said sidelink communications, said timing offset value being indicative of a time of arrival of data to be transmitted at said apparatus and where said timing offset value provides an arrival time outside of said active time to indicate to said means for generating to update one of said elements of said information configured to indicate said timing offset to a value indicative of an arrival time of said data that is within said active time.

In some example embodiments said means for reviewing said timing offset values is further configured to trigger said means for generating to generate at least one timing offset value providing an arrival time within at least one of a plurality of active times of said receiving user equipment that fall within said allowed delay time.

In some example embodiments said means for reviewing said timing offset values is further configured to trigger said means for generating to generate a plurality of timing offset value providing an arrival time within a corresponding plurality of active times of said receiving user equipment that fall within said allowed delay time.

In some example embodiments said means for comparing is configured in response to determining that said period of said discontinuous reception cycle is longer than said periodicity to compare an allowed delay time of said sidelink communication with said discontinuous reception cycle and where said allowed delay time is shorter to trigger said means for generating to derive said factor from a rounded up value of a ratio of said discontinuous reception cycle and said traffic periodicity.

In some example embodiments said means for comparing is configured to compare a duration of said active time with an allowed delay time for said sidelink communication and where said allowed delay time is longer than said duration of said active time to indicate to said means for generating to update one of said elements in said assistance information configured to provide said allowed delay time with a value equal to or shorter than said active time duration.

In some example embodiments said apparatus further comprises: means for transmitting said assistance information towards said network node; and means for receiving said grant of resources from said network node.

In some example embodiments said means for transmitting is further configured to transmit sidelink communications towards said receiving user equipment using resources indicated in said grant of resources.

In some example embodiments said means for generating is responsive to an update in said discontinuous reception cycle of said receiving user equipment to generate updated assistance information.

In some example embodiments the means comprise: at least one processor; and at least one memory including computer program code, the at least one memory and computer program code being configured to, with the at least one processor, cause the performance of the apparatus.

According to various, but not necessarily all, embodiments of the invention there is provided according to a second aspect a method, comprising generating assistance information for a network node, the network node providing a grant of resources for sidelink communications between said apparatus and at least one receiving user equipment, said at least one receiving user equipment being configured to operate in a discontinuous reception mode comprising a discontinuous reception cycle with an active time and an inactive time, said assistance information comprising a plurality of elements indicative of characteristics of said sidelink communications; wherein at least one of said plurality of elements comprises an indication of said discontinuous reception mode of said receiving user equipment.

In some example embodiments said method comprises: comparing a traffic periodicity of said sidelink communications and a period of said discontinuous reception cycle and in response to said period of said discontinuous reception cycle being different to said traffic periodicity generating said assistance information for said network node by updating said at least one of said plurality of elements in said assistance information to provide said indication of said discontinuous reception mode.

According to various, but not necessarily all, embodiments of the invention there is provided according to a third aspect a computer program comprising computer readable code which when executed by a processor is operable to control said processor to perform a method according to the second aspect.

According to various, but not necessarily all, embodiments of the invention there is provided according to a further aspect circuitry configured to generate assistance information for a network node, the network node providing a grant of resources for sidelink communications between said apparatus and at least one receiving user equipment, said at least one receiving user equipment being configured to operate in a discontinuous reception mode comprising a discontinuous reception cycle with an active time and an inactive time, said assistance information comprising a plurality of elements indicative of characteristics of said sidelink communications; wherein at least one of said plurality of elements comprises an indication of said discontinuous reception mode of said receiving user equipment.

In some example embodiments the apparatus further comprises: comparing circuitry configured to compare a traffic periodicity of said sidelink communications and a period of said discontinuous reception cycle, said generating circuitry being configured to respond to said comparing circuitry indicating that said period of said discontinuous reception cycle is different to said traffic periodicity to update said at least one of said plurality of elements to provide said indication of said discontinuous reception mode.

In some example embodiments said comparing circuitry is configured in response to said period of said discontinuous reception cycle being shorter than said periodicity to compare an allowed delay time of said sidelink communication with said discontinuous reception cycle prior to said generating circuitry updating said message size and only where said allowed delay time is longer than said discontinuous reception cycle to indicate to said generating circuitry to update said message size.

In some example embodiments, said apparatus further comprises circuitry configured to review a timing offset value for said sidelink communications, said timing offset value being indicative of a time of arrival of data to be transmitted at said apparatus and where said timing offset value provides an arrival time outside of said active time to indicate to said generating circuitry to update one of said elements of said information configured to indicate said timing offset to a value indicative of an arrival time of said data that is within said active time.

In some example embodiments said reviewing circuitry is further configured to trigger said generating circuitry to generate at least one timing offset value providing an arrival time within at least one of a plurality of active times of said receiving user equipment that fall within said allowed delay time.

In some example embodiments said comparing circuitry is configured in response to determining that said period of said discontinuous reception cycle is longer than said periodicity to compare an allowed delay time of said sidelink communication with said discontinuous reception cycle and where said allowed delay time is shorter to derive said factor from a ratio of said discontinuous reception cycle and said traffic periodicity that is rounded up to an integer value.

In some example embodiments said comparing circuitry is configured to compare a duration of said active time with an allowed delay time for said sidelink communication and where said allowed delay time is longer than said duration of said active time to trigger said generating circuitry to update one of said elements in said assistance information configured to provide said allowed delay time with a value equal to or shorter than said active time duration.

In some example embodiments said apparatus further comprising transmitting circuitry configured to transmit said assistance information towards said network node; and receiving circuitry configured to receive said grant of resources from said network node.

In some example embodiments said transmitting circuitry is further configured to transmit sidelink communications towards said receiving user equipment using resources indicated in said grant of resources.

In some example embodiments said generating circuitry is responsive to an update in said discontinuous reception cycle of said receiving user equipment to generate updated assistance information.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Figure 2:
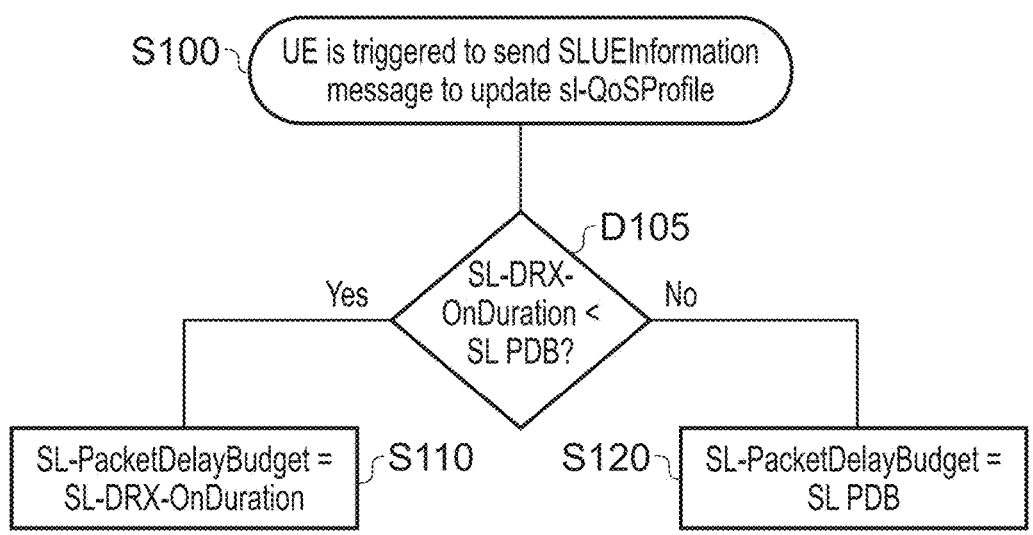
Figure 3:
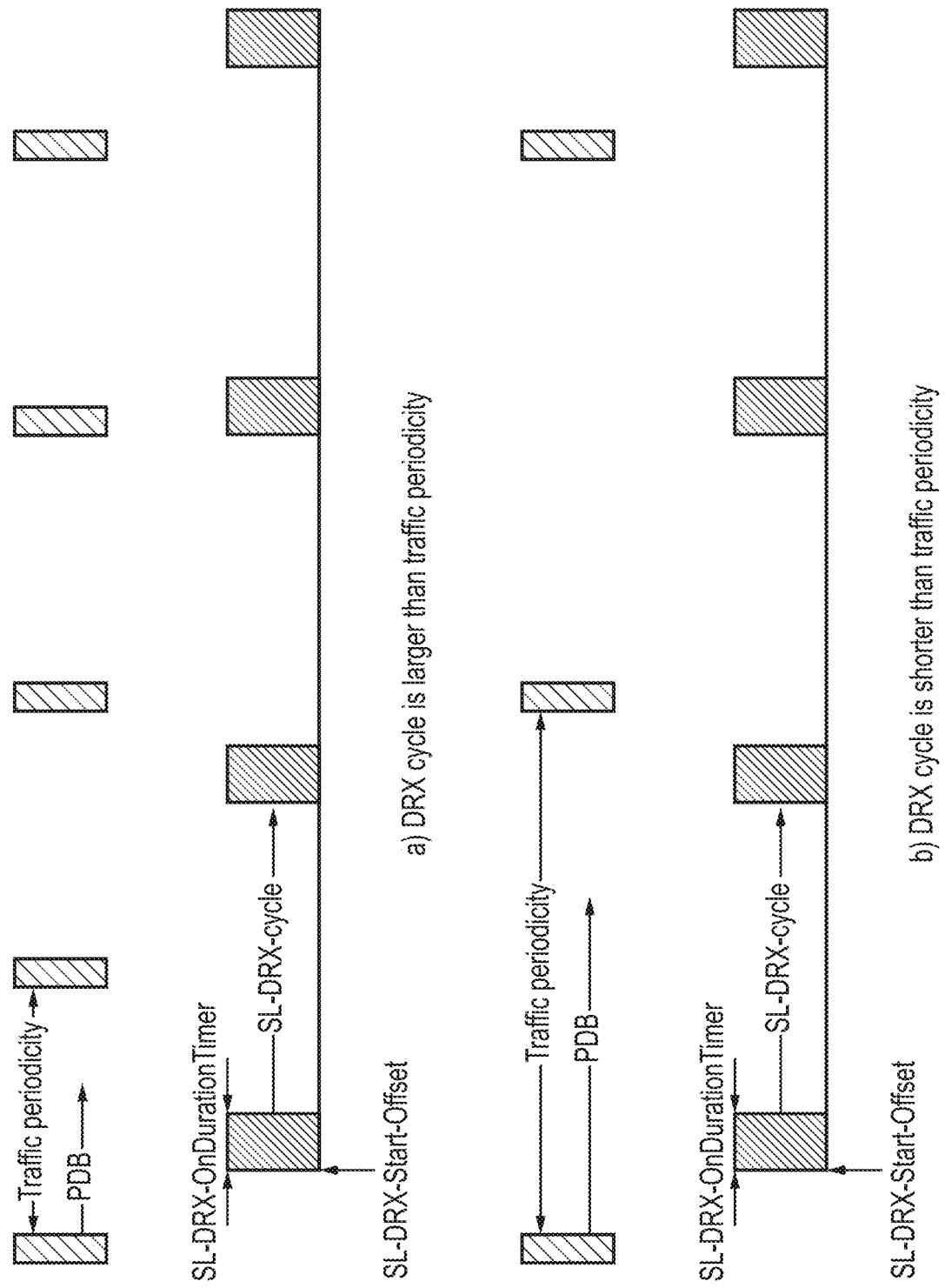
Figure 4:
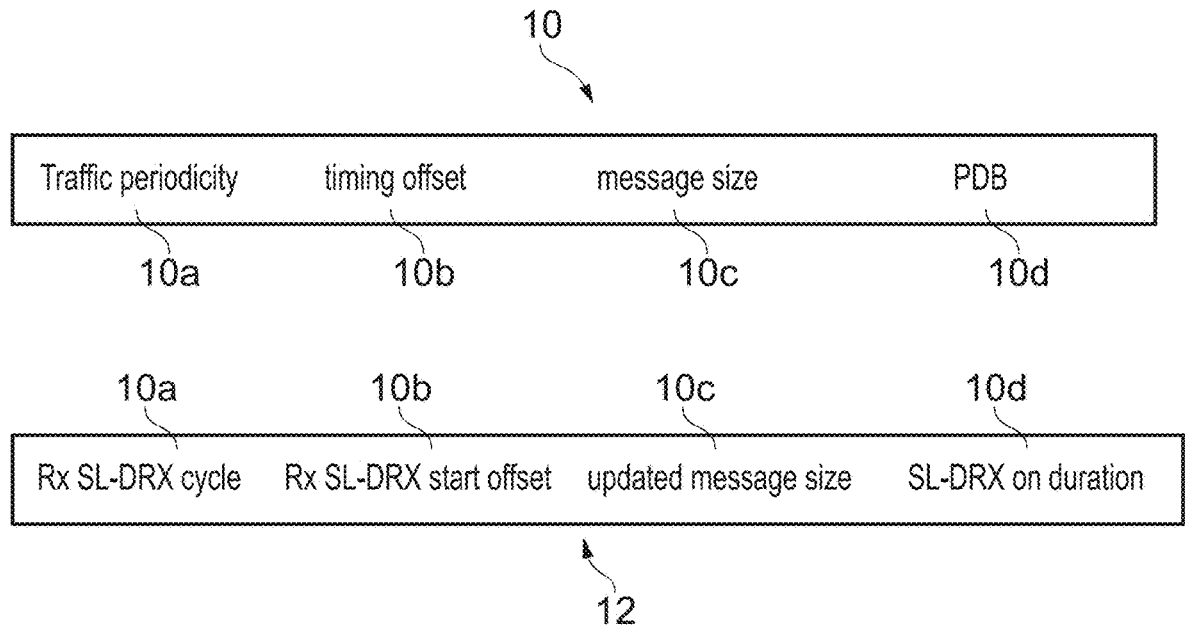
Figure 5:
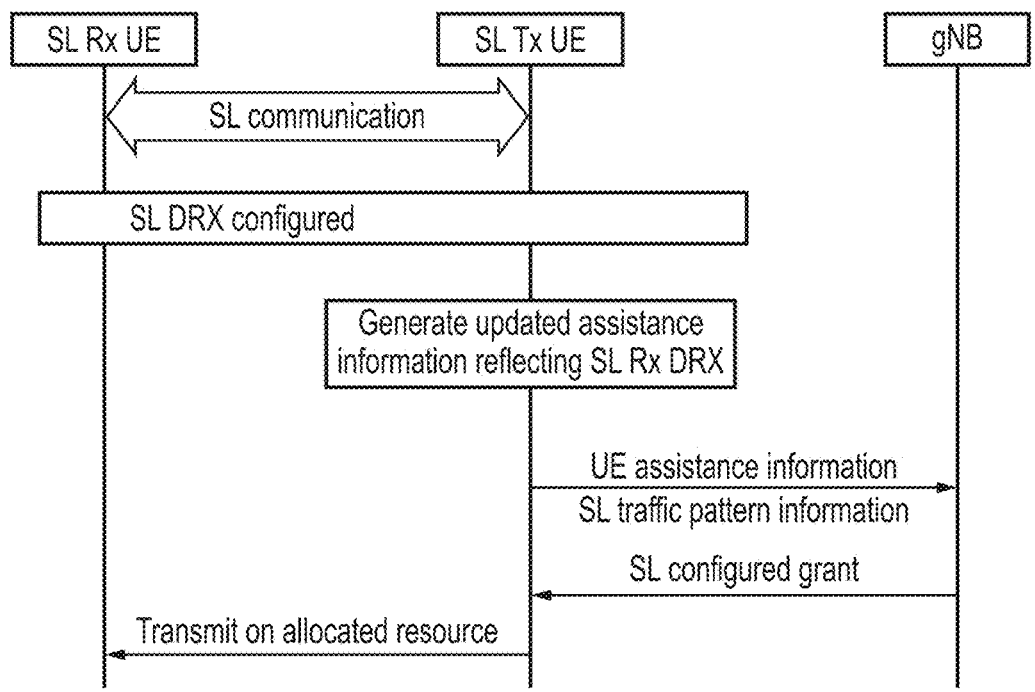
Figure 6:
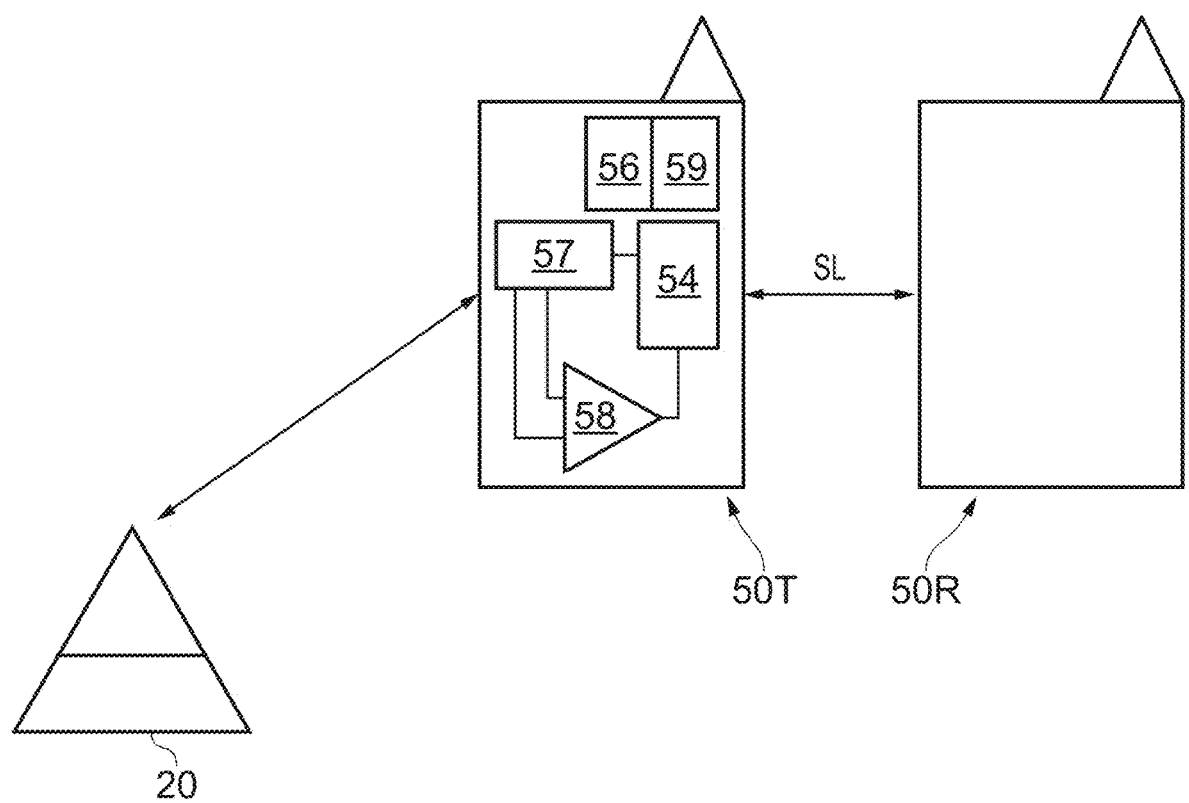

Some example embodiments will now be described with reference to the accompanying drawings in which:

FIG. 1 schematically shows a flow diagram illustrating method steps performed at a UE generating assistance information including DRX mode information;

FIG. 2 schematically shows a flow diagram illustrating steps performed when formulating SidelinkUEInformation message including DRX mode information;

FIG. 3 shows mis-aligned DRX configuration and traffic patterns;

FIG. 4 schematically shows elements of an assistance message that may be updated in embodiments;

FIG. 5 schematically shows signalling between the user equipment and network node;

FIG. 6 schematically shows a user equipment according to an embodiment; and

Figure 7:
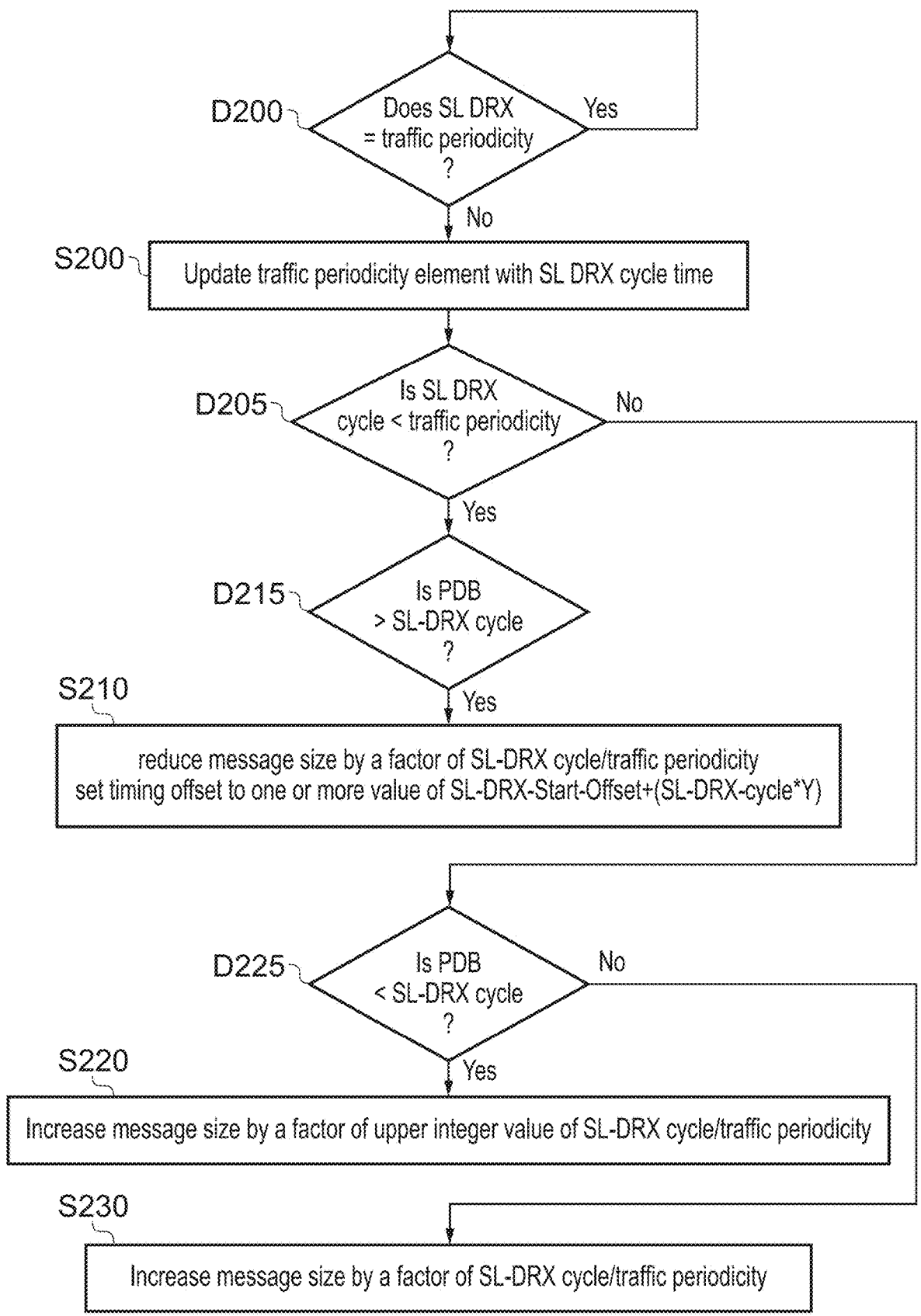

FIG. 7 shows a flow diagram illustrating steps in a method according to an embodiment.

DETAILED DESCRIPTION

Before discussing the example embodiments in any more detail, first an overview will be provided.

Example embodiments relate to sidelink communications between user equipment. Sidelink communications have been used for V2X communications (vehicle to everything) where conventionally the UE was always on. However, power saving has been introduced for sidelink communications making them more applicable for vulnerable road users and for UEs in public safety and commercial use cases. Where power saving has been introduced the user equipment may operate in a discontinuous reception mode DRX, so that at times a UE is not active and not able to receive a signal.

There are two potential modes of sidelink resource allocation: mode 1 where—the sidelink transmission resource is scheduled by the network node, which may be a gNB that is a 5G network node; or—mode 2 where the UE autonomously selects a sidelink transmission resource from a pool of resources. Where sidelink DRX is used a receiving UE is periodically in an inactive mode to save power and is unable to receive signals. This can present problems when allocating resources for the sidelink communications as were the resource to be allocated in an inactive time period of the receiving UE, then the signal would not be received. With mode 1 allocation of resources by the gNB, the gNB may not have sufficient information on whether the receiving UE is active or not and thus, may be unable to guarantee that any resource allocated is within an active time period of the receiving UE.

In current SL design, UE Assistance Information procedure is specified in 3GPP TS38.331 which allows the UE to inform the network of configured grant assistance information for SL communication. This information may include:

```
SL-UE-AssistanceInformationNR-r16 ::= SEQUENCE
(SIZE(1..maxNrofTrafficPattern-
r16)) OF SL-TrafficPatternInfo-r16
SL-TrafficPatternInfo-r16::= SEQUENCE {
trafficPeriodicity-r16    ENUMERATED {ms20, ms50, ms100, ms200,
ms300, ms400, ms500, ms600, ms700, ms800, ms900, ms1000},
timingOffset-r16          INTEGER (0..10239),
messageSize-r16           BIT STRING (SIZE (8)),
sl-QoS-FlowIdentity-r16   SL-QoS-FlowIdentity-r16 }
``` sl-QoS-FlowIdentity uniquely identifies one sidelink QoS flow between the UE and the network in the scope of UE, which is unique for different destination and cast type. So sl-QoS-FlowIdentity can be used to identify the destination of SL communication, i.e. SL Rx UE.

The other information elements such as trafficPeriodicity, timingOffset, messageSize in SL-TrafficPatternInfo are based on the service traffic characteristics.

The inventors recognised that the assistance information sent to the network node affects how the resources to the UE are allocated. Thus, they realised that were the elements of the assistance information indicating characteristics of the sidelink communications that were currently sent changed, the timing of the allocation of the resources would be correspondingly altered and thus, by careful manipulation of these elements the allocation of sidelink resources might be controlled to be consistently within the active time of the Rx UE without the need to provide additional signalling overhead.

In some examples elements of the UE assistance information sent to the gNB in the form of SL-TrafficPatternInfo of UEAssistanceInformation message are updated to reflect the SL DRX configuration.

In effect embodiments seek to reuse at least one of the existing standard procedure and signalling messages to report Rx UE's SL DRX configuration without introducing additional signalling and standardization overhead to address the problem of mis-aligned SL configured grant of mode 1 to SL Tx UE and the active time of SL Rx UE's DRX.

Embodiments propose a new UE behaviour on reporting of SL traffic pattern to implicitly provide the active time information of SL Rx UE's DRX to serving gNB of SL Tx UE to facilitate SL configured grant of mode 1 resource allocation.

In summary a UE configured for sidelink communication is configured to transmit assistance information to the gNB that allows the gNB to provide informed semi-persistent scheduling of resources for the sidelink communications in a configured sidelink grant. The assistance information may be provided in a message with a plurality of elements, the elements providing information on different characteristics of the sidelink communication such as traffic periodicity, message size, timing offset, and required quality of service for the communications. The assistance information is provided in a known format so that each element can be identified by the network node receiving the information. Updating of one or more of these elements to reflect the SL DRX configuration of the Rx UE allows the allocation of the resources to be consistently, or at least more probably, within the active time period of the Rx UE.

Thus, embodiments seek to provide information regarding the discontinuous reception mode of a receiving UE-Rx UE and in particular information regarding the Rx UE's active time using these existing assistance information messages, amended so that the information provided takes account of the active time of the receiving user equipment. This process may be transparent to the network node.

In some example embodiments in addition to, or instead of, QoS and traffic characteristics of SL service traffic, SL Tx UE may also take SL Rx UE's DRX configuration into account to formulate the following IEs of RRC: UEAssistanceInformation and SidelinkUEInformation message to implicitly indicate the active time of Rx UE's DRX configuration without introducing new signalling messages.

Where SL-DRX-cycle of SL Rx UE's DRX configuration is not equal to the traffic periodicity of SL service traffic of SL communication between SL Tx UE and Rx UE, the IE of trafficPeriodicity in SL-TrafficPatternInfo of UEAssistanceInformation may be set to the SL Rx UE's SL-DRX-cycle instead of the traffic periodicity.

Note that in the Uu interface the SL-DRX-cycle parameter is equivalent to the periodicity part (i.e. drx-LongCycle) of the drx-LongCycleStartOffset parameter within the DRX-Config IE, in SL the parameter name has not yet been defined.

Due to unequal SL-DRX-cycle and traffic periodicity, the amount of SL traffic arriving in one SL-DRX-cycle does not equal the real message size of SL service traffic. To address this, the IE (information element) of messageSize in SL-TrafficPatternInfo of UEAssistanceInformation may be set to X times that of the real message size of SL service traffic, wherein X=SL-DRX-cycle/traffic periodicity.

If the timing offset of traffic pattern of SL service traffic is not within the active time of SL Rx UE's DRX, then the IE of timingOffset in SL-TrafficPatternInfo of UEAssistanceInformation is set to SL-DRX-Start-Offset instead of timing offset of SL traffic. In this way, it will trigger gNB to allocate mode 1 resources only after SL-DRX-Start-Offset when Rx UE's enters ON duration according to configured SL DRX.

Note that in the Uu interface the SL-DRX-Start-Offset parameter is equivalent to the offset part (i.e. drx-StartOffset) of the drx-LongCycleStartOffset parameter within the DRX-Config IE.

If SL-DRX-OnDurationTimer is shorter than packet delay budget of QoS profile of SL service traffic, IE of SL-PacketDelayBudget in SL-Non-StandardizedPQI of SL-QoS-Profile of SidelinkUEInformation message is set to SL-DRX-OnDurationTimer value instead of real packet delay budget of SL service traffic. In this way, it can trigger gNB to allocate mode 1 resources within DRX ON duration of Rx UE's DRX configuration as gNB's scheduler should allocate the resources to meet packet delay budget requirement of QoS.

Note that in the Uu interface the SL-DRX-OnDurationTimer parameter is equivalent to the drx-on DurationTimer parameter within the DRX-Config IE.

Flow charts indicating methods performed at the SL Tx UE according to some embodiments are given in FIG. 1 and FIG. 2.

FIG. 1 shows method steps performed when formulating the corresponding relevant IE in UEAssistanceInformation message updated to reflect the Rx UE active time and FIG. 2 shows steps performed when formulating the corresponding relevant IE in SidelinkUEInformation message updated to reflect Rx UE active time.

FIG. 1 shows steps in a method perform when the UE is triggered to send UEAssistanceInformation message to update the SL-TrafficPatternInfo at the network node. This triggering is shown as step S10 and the UE responds by determining at step D5 whether the Sidelink DRX cycle is equal to the SL-trafficPeriodicity. If it is determined to be equal then at step S30 the trafficPeriodicity element of the UEAssistanceInformation is simply set to SL-trafficPeriodicity if it is not determined to be equal then at step S20 the trafficPeriodicity element is set to the SL DRX cycle length. Following step S20 the message size in the assistance information is updated at step S40 to the original message size multiplied by a factor that is equal to the length of the SL DRX cycle divided by the traffic periodicity. Thus, where the discontinuous mode cycle is longer than SL-trafficPeriodicity the message size is increased whereas where it is shorter it is decreased. This is because by using the length of time of the SL DRX cycle rather than the SL-trafficPeriodicity in the assistance information the allocation of resources for sidelink communications will be altered to correspond to this timing and thus, where the period is longer (SL DRX cycle>SL-trafficPeriodicity) multiple messages may arrive at the UE in each DRX cycle, therefore more resources will be required to transmit these multiple messages and to accommodate this the message size in SL-TrafficPatternInfo is increased, while where SL DRX cycle<SL-trafficPeriodicity the average number of bits to be transmitted per cycle is less since average number of messages that arrive at each DRX cycle is less than 1.

At step D15 the UE also determines whether the timing offset of the sidelinkTrafficPattern is within the active time of the SL DRX. If it is then the timing offset is simply set to the normal timing offset at step S50, whereas if it is not then the timing offset is set to a start of the active time of the SL DRX at step S60. In this regard, the timing offset is the time that the data that is to be transmitted by the sidelink messages arrives at the Tx UE.

FIG. 2 shows a further method where updated sidelink UE information messages are generated and transmitted. In an initial step S100 the UE is triggered to send SidelinkUEInformation message to update the quality of service profile for the sidelink communications. The UE then determines at step D105 whether the sidelink DRX on duration is less than the sidelink packet delay budget (PDB), that is an acceptable delay time for transmitting the message, if it is left then the sidelink PDB element in the information message is set to the on duration of the active time of the DRX reception mode at step S110, while if it is not the sidelink packet delay budget element is simply set to the sidelink packet delay budget at step S120.

Usually the service traffic pattern is one of the aspects to be considered when DRX is configured. However, it may not always be possible to have fully aligned DRX configuration and the corresponding traffic pattern of the targeted services, especially when one SL Rx UE is involved in multiple SL communications with different cast type. Some examples of the mis-aligned DRX configuration and traffic pattern are illustrated in FIG. 3. In such case, if Tx UE reports SL traffic pattern information without considering Rx UE's DRX configuration, it cannot guarantee that SL configured grant of mode 1 resource allocated by gNB will fall into the active time of SL Rx UE's DRX. Embodiments seek to address this, in some cases using the SL-TrafficPatternInfo in RRC: UEAssistanceInformation message set according to SL DRX of Rx UE instead of traffic pattern of SL Tx UE's service traffic as follows:

```
SL-TrafficPatternInfo-r16::= SEQUENCE {
trafficPeriodicity-r16 = SL-DRX-cycle,
timingOffset-r16 = SL-DRX-Start-Offset,
messageSize-r16 = message size of traffic * [SL-DRX-cycle/traffic
periodicity]
}
```

Therefore, the UEAssistanceInformation and/or SidelinkUEInformation message transmission from SL Tx UE may be triggered not only due to update of SL traffic pattern and/or SL QoS profile, but also in response to an update of SL DRX configuration in SL Rx UE.

FIG. 4 shows very schematically different elements of the assistance information that may be transmitted to the network node to assist it to perform sidelink configured grant. In this example assistance information 10 that is conventional assistance information includes an element 10a indicating trafficPeriodicity, an element 10b indicating timing offset, an element 10C indicating message size and an element 10D indicating the packet delay budget for the SL communication. Updated assistance information 12 according to an embodiment shows each of these elements updated to reflect the DRX cycle of the Rx UE. In this regard, although all of them are shown as being updated in this example, in embodiments only one or a subset of them may be updated.

Thus, the element 10a that was conventionally SL-trafficPeriodicity may be updated to reflect the cycle length of the DRX mode for the receiving UE. Element 10b which is conventionally the timing offset may be updated to reflect the start of the active time for the Rx UE. Element 10c which is conventionally message size may be updated to provide an updated message size that may be based on the original message size multiplied by a factor that depends on the ratio of the SL DRX mode cycle at the Rx UE and the SL-trafficPeriodicity. Element 10d which is conventionally the packet delay budget may be updated to reflect the active time duration of the SL DRX mode at the Rx UE.

FIG. 5 schematically shows signalling between the receiving UE transmitting UE and a network node gNB. Initially the two user equipment may communicate directly with each other using sidelink communications. At one point the SL DRX may be configured and the UEs enter a power saving mode with discontinuous reception. In response to this the transmitting UE may generate updated assistance information that reflects the SL DRX mode cycle and this updated assistance information may be transmitted to the network node as part of the UE assistance information and/or as part of the sidelink traffic patent information. In response to this the network node will provide a sidelink configured grant allocating resources to the transmitting UE and these configured resources will reflect the SL DRX mode of the receiving UE. The transmitting UE may then transmit to the receiving UE on the allocated resources.

FIG. 6 schematically shows a network node 20 configured to allocate resources for sidelink communications between a transmitting UE 50T and a receiving UE 50R. Transmitting UE 50T comprises generating circuitry 54 that is configured to generate updated assistance information for transmission by transmitting circuitry 56 to the network node 20. This generating circuitry 54 receives signals from comparator circuitry 58 which is configured to compare values such as SL traffic periodicity with the DRX cycle of the receiving UE 50R. Where they are not equal it will indicate this to the generating circuitry 54 which will respond by generating updated assistance information for transmission to the network node.

Transmitting UE 50T also comprises reviewing circuitry 57 for reviewing the timing offset values for the sidelink communications these values being indicative of a time of arrival of data to be transmitted by the transmitting UE 50T. The reviewing circuitry compares these values with the active time of the receiving UE and where they are outside of the active time generates an indication to generating circuitry 54 indicating that time offset value should be updated.

Comparing circuitry 54 also compares other values such as the value of packet delay budget and with the SL DRX cycle period and sends the results of the comparison to generating circuitry 54 that responds to the results by updating the messages sizes in the assistance information.

The updated UE assistance information is transmitted by transmitting circuitry 56 to network node 20. Network node 20 responds to receipt of UE assistance information by providing a configured sidelink grant which is a semi persistent grant of resources for sidelink communications.

These are received at receiving circuitry 59 at the transmitting UE 50T and the allocated SL resources are then used to transmit sidelink communications to the receiving user equipment 50R.

Further examples of how the different elements of the assistance information may be updated to reflect the SL DRX mode at the receiving UE are provided below.

In addition to SL Rx UE's DRX configuration, the QoS of SL Tx UE's service traffic may also impact the setting of parameters of SL-TrafficPatternInfo.

In one embodiment, if SL-DRX-cycle is shorter than traffic periodicity, SL Tx UE may, depending on PDB (packet delay budget) of the traffic, determine whether real message size or reduced message size (=real message size*[SL-DRX-cycle/traffic periodicity]) should be provided. For instance, if PDB is larger than SL-DRX-cycle, the reduced message size can be provided. Otherwise, the real message size is provided.

In one embodiment, if SL-DRX-cycle is shorter than traffic periodicity, depending on PDB of the traffic, determined message size (whether real message size or reduced message size) and/or traffic density, SL Tx UE may set timing offset of traffic pattern of a SL service traffic as the time offset from beginning of the first SL DRX cycle to SL-DRX-Start-Offset of any of the SL DRX cycle (which has SL DRX ON duration) within the traffic periodicity. In a simpler implementation, the timing offset can be equal to SL-DRX-Start-Offset+(SL-DRX-cycle*Y) where Y can be any integer value between 0 and lower integer of [traffic periodicity/SL-DRX-cycle]−1. This allows for the SL UE to trigger gNB to allocate the configured grant such that the SL traffic is distributed among different SL DRX cycles (consequently to different active times) of SL Rx UE's DRX to meet the PDB requirements.

In one embodiment, if SL-DRX-cycle is larger than traffic periodicity, SL Tx UE may determine to use upper integer value of [SL-DRX-cycle/traffic periodicity] to multiply with real message size as the reported message size in SL-trafficPatternInfo if PDB is shorter than SL-DRX-cycle. In this way, SL data that arrived during two consecutive traffic arrival periods can be transmitted during one SL DRX cycle when PDB is shorter than SL-DRX-cycle. For example, if SL-DRX-cycle is 40 ms and traffic periodicity is 30 ms, it may happen that two messages arrives during one SL-DRX-cycle. So SL Tx UE may report message size=2*real message size to trigger gNB allocate the configured grant for the data volume of 2 times real message size if PDB of SL traffic is shorter than 40 ms. Otherwise, if PDB of SL traffic is longer and the SL data can wait for more than one SL-DRX-cycle, SL Tx UE may report message size=1.3*real message size to trigger more efficient mode 1 resource allocation from gNB.

FIG. 7 provides a flow diagram outlining steps of a method performed at the transmitting UE according to some of the embodiments described above At step D200 it is determined whether the sidelink DRX cycle is equal to the traffic periodicity and if it is then the UE does not update the assistance information. If however the comparison indicates that they are not equal then the traffic periodicity element within the assistance information may be updated with the sidelink DRX cycle time at step S200.

At step D205 it is determine if the SL DRX cycle is less than the traffic periodicity and if so, then it is determined if the PDB for the SL communication is larger than the SL DRX cycle at step D215, if it is the message size is reduced by a factor that is the ratio of the DRX cycle to the traffic periodicity, otherwise the message size remains unaltered. The timing offset is also updated and set to one or more values of the start time of an active cycle at the Rx UE in a next or in subsequent cycles. In this regard, where the PDB is greater than the SL DRX cycle then there is more than one Rx UE active time in which a message can be sent in and still be within the PDB and thus, the timing for the sending of the message may be set to be any one or several of those active times within the PDB.

If the SL DRX mode cycle at Rx UE is found not to be less than the traffic periodicity in other words it is found to be greater at step D205 then at step D225 it is determined whether the PDB is smaller than the SL DRX cycle and if so then the message size is increased by a factor of an upper integer value of the ratio of the SL DRX cycle to the traffic periodicity. In other words, were this to be 2.3 it would be set to 3 that is the factor is round up.

If the packet delay budget is not less than the SL DRX cycle then at step S230 the message size is increased by a factor of the ratio SL DRX cycle to the traffic periodicity.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory (ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:
at least one processor; and
at least one memory storing instructions that, when executed by the at least one processor, cause the apparatus at least to perform:
generating assistance information for a network node, the network node providing a grant of resources for sidelink communications between said apparatus and at least one receiving user equipment, said at least one receiving user equipment being configured to operate in a discontinuous reception mode comprising a discontinuous reception cycle with an active time and an inactive time, said assistance information comprising a plurality of elements indicative of characteristics of said sidelink communications; wherein
at least one of said plurality of elements comprises an indication of said discontinuous reception mode of said receiving user equipment.

2. The apparatus according to claim 1, wherein said assistance information comprises at least one of UE assistance information and UE sidelink information.

3. The apparatus according to claim 1, wherein, when executed by the at least one processor, the instructions cause the apparatus at least to further perform:
comparing a traffic periodicity of said sidelink communications and a period of said discontinuous reception cycle, said generating said assistance information being responsive to said comparing indicating that said period of said discontinuous reception cycle is different to said traffic periodicity to update said at least one of said plurality of elements to provide said indication of said discontinuous reception mode.

4. The apparatus according to claim 3, wherein said at least one of said plurality of elements comprises an element configured to indicate periodicity data, said element being updated with an indication of a period of said discontinuous reception cycle.

5. The apparatus according to claim 3, wherein said at least one of said plurality of elements comprises an element configured to indicate a message size, said element being updated by multiplying said element by a factor derived from a ratio of said discontinuous reception cycle to said traffic periodicity.

6. The apparatus according to claim 5, wherein, when executed by the at least one processor, the instructions cause the apparatus to, in response to said period of said discontinuous reception cycle being shorter than said periodicity, compare an allowed delay time of said sidelink communication with said discontinuous reception cycle and to only indicate to update said message size element where said allowed delay time is longer than said discontinuous reception cycle.

7. The apparatus according to claim 5, wherein, when executed by the at least one processor, the instructions cause the apparatus at least to further perform:
in response to said period of said discontinuous reception cycle being shorter than said periodicity, comparing an allowed delay time of said sidelink communication with said discontinuous reception cycle and only indicating to update said message size element where said allowed delay time is longer than said discontinuous reception cycle;
reviewing a timing offset value for said sidelink communications, said timing offset value being indicative of a time of arrival of data to be transmitted at said apparatus and where said timing offset value provides an arrival time outside of said active time to trigger updating one of said elements of said information configured to indicate said timing offset to a value indicative of the arrival time of said data that is within said active time; and,
generating at least one timing offset value providing the arrival time within at least one of a plurality of active times of said receiving user equipment that fall within said allowed delay time.

8. The apparatus according to claim 5, wherein, when executed by the at least one processor, the instructions cause the apparatus to, in response to determining that said period of said discontinuous reception cycle is longer than said periodicity, compare an allowed delay time of said sidelink communication with said discontinuous reception cycle and where said allowed delay time is shorter to indicate to derive said factor from a ratio of said discontinuous reception cycle and said traffic periodicity that is rounded up to an integer value.

9. The apparatus according to claim 3, wherein, when executed by the at least one processor, the instructions cause the apparatus at least to further perform:
reviewing a timing offset value for said sidelink communications, said timing offset value being indicative of a time of arrival of data to be transmitted at said apparatus and where said timing offset value provides an arrival time outside of said active time to trigger updating one of said elements of said information configured to indicate said timing offset to a value indicative of an arrival time of said data that is within said active time.

10. The apparatus according to claim 3, wherein, when executed by the at least one processor, the instructions cause the apparatus to compare a duration of said active time with an allowed delay time for said sidelink communication and where said allowed delay time is longer than said duration of said active time to indicate to update one of said elements in said assistance information configured to provide said allowed delay time with a value equal to or shorter than said active time duration.

11. The apparatus according to claim 1, wherein, when executed by the at least one processor, the instructions cause the apparatus to further perform:
transmitting said assistance information towards said network node; and
receiving said grant of resources from said network node.

12. The apparatus according to claim 11, wherein, when executed by the at least one processor, the instructions cause the apparatus at least to further perform:
transmitting sidelink communications towards said receiving user equipment using resources indicated in said grant of resources.

13. The apparatus according to claim 1, wherein said generating is responsive to an update in said discontinuous reception cycle of said receiving user equipment to generate updated assistance information.

14. A method, comprising generating assistance information for a network node, the network node providing a grant of resources for sidelink communications between said apparatus and at least one receiving user equipment, said at least one receiving user equipment being configured to operate in a discontinuous reception mode comprising a discontinuous reception cycle with an active time and an inactive time, said assistance information comprising a plurality of elements indicative of characteristics of said sidelink communications; wherein
at least one of said plurality of elements comprises an indication of said discontinuous reception mode of said receiving user equipment.

15. The method according to claim 14, said method comprising:
comparing a traffic periodicity of said sidelink communications and a period of said discontinuous reception cycle and in response to said period of said discontinuous reception cycle being different to said traffic periodicity generating said assistance information for said network node by updating said at least one of said plurality of elements in said assistance information to provide said indication of said discontinuous reception mode.

16. A non-transitory computer readable medium comprising program instructions that, when executed by an apparatus, cause the apparatus to perform at least the following:
generating assistance information for a network node, the network node providing a grant of resources for sidelink communications between said apparatus and at least one receiving user equipment, said at least one receiving user equipment being configured to operate in a discontinuous reception mode comprising a discontinuous reception cycle with an active time and an inactive time, said assistance information comprising a plurality of elements indicative of characteristics of said sidelink communications; wherein
at least one of said plurality of elements comprises an indication of said discontinuous reception mode of said receiving user equipment.

17. The non-transitory computer readable medium according to claim 16, wherein, when executed by the apparatus, the program instructions cause the apparatus to further perform:
comparing a traffic periodicity of said sidelink communications and a period of said discontinuous reception cycle and in response to said period of said discontinuous reception cycle being different to said traffic periodicity generating said assistance information for said network node by updating said at least one of said plurality of elements in said assistance information to provide said indication of said discontinuous reception mode.

\* \* \* \* \*